United States Patent

[11] 3,604,328

[72] Inventor Sadao Nakagawa
 Tokyo, Japan
[21] Appl. No. 859,398
[22] Filed Sept. 19, 1969
[45] Patented Sept. 14, 1971
[73] Assignee Nippon Kogaku K.K.
 Tokyo, Japan
[32] Priority Sept. 28, 1968
[33] Japan
[31] 43/84586

[54] SLIDE COPYING DEVICE
 1 Claim, 5 Drawing Figs.
[52] U.S. Cl. .................................................. 95/12,
 95/65
[51] Int. Cl. ...................................................... G03b 29/00
[50] Field of Search............................................ 95/12, 65;
 355/40

[56] References Cited
UNITED STATES PATENTS
| | | | |
|---|---|---|---|
| 1,368,761 | 2/1921 | Schlegel | 95/65 X |
| 1,368,880 | 2/1921 | Bettini | 355/40 |
| 2,113,580 | 4/1938 | Draeger | 95/65 |
| 3,514,206 | 5/1970 | Harvey | 95/12 X |

FOREIGN PATENTS 1,045,740  10/1966  Great Britain................  355/40

Primary Examiner—Samuel S. Matthews
Assistant Examiner—Monroe H. Hayes
Attorney—Harry G. Shapiro ABSTRACT: A slide copying device is provided which is capable of moving in both horizontal and vertical directions to allow trimming of a slide both horizontally and vertically. The device employs a single dual purpose clamp handle, which also is used as the handle for the trimming operations.

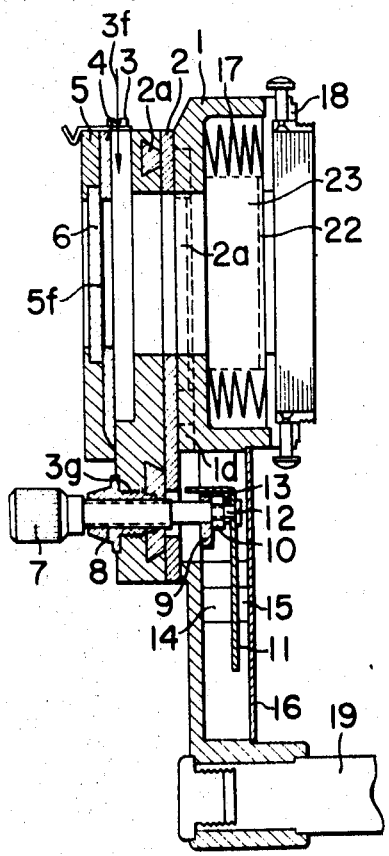
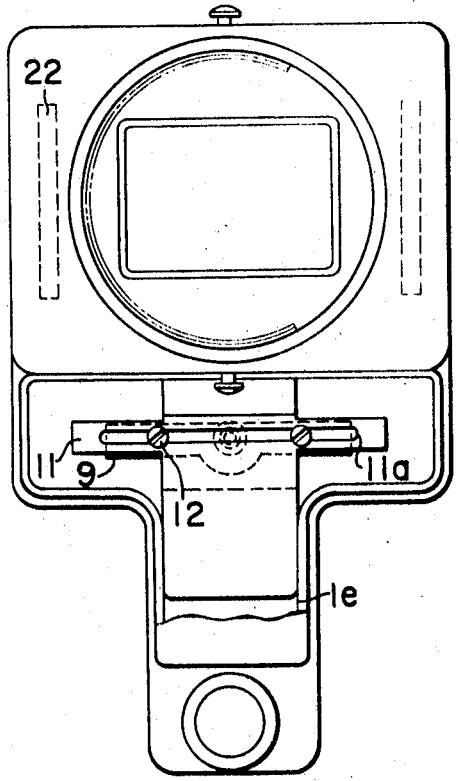
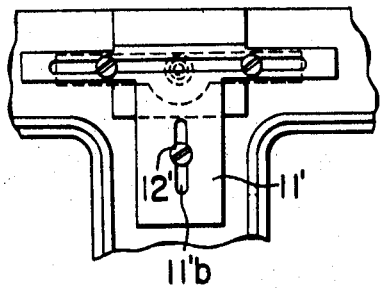

SLIDE COPYING DEVICE

This invention relates to a slide copying device which, upon being placed in front of the taking lens of a camera, permits a slide to be trimmed in both horizontal and vertical directions about an arbitrary point of the film.

In conventional slide copying equipment, which holds film to determine the portion to be copied, movement of the film and the trimming thereof may be made only in the direction in which the film is inserted in the equipment; that is, in a vertical direction. Trimming in a horizontal direction has not been possible.

The principal object of the invention is to overcome the foregoing limitation, and to provide a slide copying device capable of movement in both horizontal and vertical directions to allow trimming of a slide both horizontally and vertically. This object is accomplished by a slide copying device constructed to include a single dual purpose clamp handle, which also is used as the handle for the trimming operations.

This invention will be described more clearly referring to the illustrative embodiments shown in the accompanying drawings, in which:

FIG. 1 is a vertical cross-sectional view of an embodiment of the invention;

FIG. 3 is a front view, partly broken away, of the device shown in FIG. 1;

FIG. 4 is a partial front view illustrating another embodiment of the invention.

Figure 2:
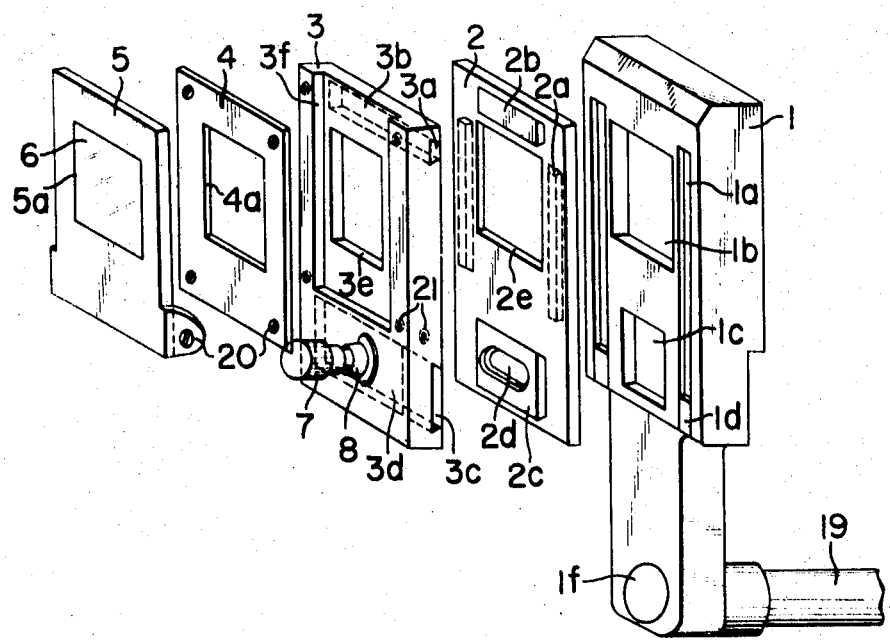
FIG. 2 is a perspective view of the dovetailed portion of the device shown in FIG. 1 in its disassembled state.

Referring to FIGS. 1, 2 and 3, a slide copying device in accordance with the invention comprises a main unit 1, an intermediate or dovetail holding plate 2, a film holding plate 3, a picture frame 4 and a roll film pressure plate 5.

As also shown in FIGS. 1, 2 and 3, the main unit 1 comprises a predetermined window 1b, or a window having predetermined dimensions; a dovetail groove 1a; a straight sided or substantially square or rectangular aperture 1c; a limiter 1d; and, near the lower extremity of the main unit, an aperture or hole 1f is provided for a purpose to be subsequently described. Preferably, and as illustrated, the main unit 1 is provided with a pair of spaced, vertically extending dovetail grooves 1a, one on each side of the window 1b and the aperture 1c. Also, a limiter or stop 1d is positioned at the lower extremity of each dovetail groove.

The intermediate dovetail holding plate 2 is provided on the side facing the main unit 1 with dovetails 2a which are matingly received within the dovetail grooves 1a of the main unit. The opposite side of the plate 2 is provided with a pair of horizontally extending, vertically spaced dovetails 2b and 2c. An elliptical or elongated hole 2d, which has its major axis in a horizontal plane, extends through the plate at the lower dovetail 2c. The plate 2 is provided with a predetermined window 2e, or a window having predetermined dimensions.

The film holding plate 3 is provided on the side facing the plate 2 with a horizontally extending dovetail groove 3b to receive the dovetail 2b on the adjoining face of the plate 2. A limiter or stop 3a is provided at an end of the groove 3b. At the lower end of the film holding plate 3, a horizontally extending dovetail groove 3d is provided to matingly receive the dovetail 2d on the adjoining face of the plate 2. A limiter or stop 3c is provided at one end of the groove 3d. The film holding plate 3 has a predetermined window 3e extending therethrough, or a window having predetermined dimensions. The film holding plate also is provided with an opening or slot 3f for the insertion of film from the top. Below the lower end of the slot 3f, an internally threaded opening 3g (see FIG. 1) is extended through the plate in alignment with the openings 2d and 1c in the plate 2 and the main unit 1. A female screw 8 having a central bore is secured to and extends through the film holding plate 3 at its internally threaded portion 3g. A clamp shaft 7, knurled at one end to furnish a handle, extends through the bore of the screw 8 and has a nut 10 threaded onto the opposite end thereof. As shown in FIG. 2, the film holding plate 3 is further provided with tapped holes 21.

The picture frame 4 is provided with a predetermined window 4a, or a window having predetermined dimensions. The picture frame is fixed to the film holding plate 3 by any suitable means such as set screws 20 which are received in the tapped holes 21 in plate 3.

The roll film pressure plate 5 is provided with a window 5a within which is set a milky kind of glass or the like to allow illumination of a transparency. The pressure plate 5 is connected to the film holding plate 3 by the set screws 20 which are extended through ears at the lower end and at each side of the pressure plate and into the tapped holes 21 in the plate 3.

As best shown in FIGS. 1 and 3, a horizontal direction sliding plate 9 is sandwiched between the nut 10 threaded onto the end of the clamp shaft 7 and the adjoining surface of the main unit 1. An associated vertical direction sliding plate 11 is supported by a headed screw or a pair of spaced screws 12 extended through a horizontally extending slot 11a in the plate (FIG. 3), the screws being threaded into the sliding plate 9. As shown in FIG. 1, spaced elements of cushioning material 14 and 15 engage opposite sides of the sliding plate 11, the cushioning element 14 being adhered to the main unit 1 and the cushioning element 15 being adhered to a lid 16. The vertical sliding plate 11 is movable with respect to the aperture 1c in the main unit 1 and, as shown in FIG. 3, such plate is confined and guided for movement vertically by vertically extending means 1e on the adjoining surface of the main unit 1. A washer 13 determines the positions of the nut 10 and of the vertical direction sliding plate 11.

Figure 5:
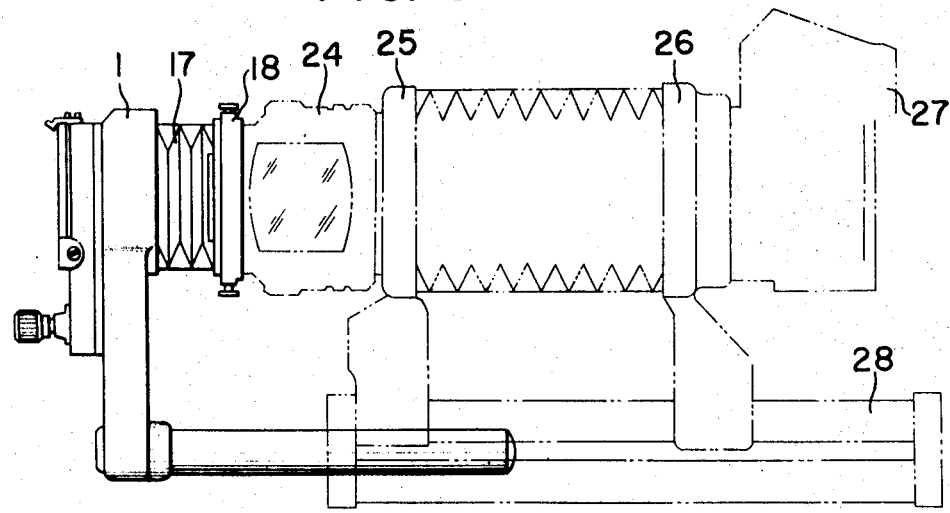
FIG. 5 illustrates the slide copying device of the invention as related to the lens of a camera to permit changing the magnification factor for the trimming of a portion of the film.

As shown in FIGS. 1 and 5, a light shielding bellows 17 has one end thereof fixed or secured to the main unit 1 and the other end is fixed to a coupling section 18 for the connection thereto of a lens and bellows. The connection is made by a magnet 23, a steel plate 22 fixed to the coupling section 18 furnishing the necessary magnetic quality for the connection of the parts.

As shown in FIG. 5, a taking lens system 24 is connected to the coupling section 18, and a mounting board 25 is provided to support the lens system 24. Another mounting board 26 is provided for the mounting and support of a camera 27. A sliding section 28 is provided to permit setting the film at any desired position on the optical axis of the taking lens by means of the device of the invention. A connecting rod 19, which has one end thereof positioned in the opening 1f of the main unit, is cooperable with the sliding section 28 for the appropriate positioning of the slide copying device with respect to the taking lens and the camera to enable changing the magnification factor for trimming a selected portion of the original film by the picture frame 4.

The vertical movement of the original film is carried out by the dovetail 2a and the dovetail groove 1a. For such movement, the intermediate plate 2 and the film holding plate 3 move in unison. The horizontal movement of the original film is performed by the dovetails 2b and 2c and the dovetail grooves 3b and 3d. For such movement, the main unit 1 and the intermediate plate 2 are combined into one, and only the film holding plate 3 moves relative to the dovetail holding plate 2. Each dovetail may move until it engages its associated limiter. The sizes of the main unit 1, the intermediate plate 2, the film holding plate 3, and each dovetail section are so designed so that the dovetail section are not exposed by the movement of the dovetails.

With the described construction, and as shown in FIG. 1, when a framed film is inserted into the film insertion opening 3f, or film on a roll is sandwiched at 5f between the picture frame 4 and the roll film pressure plate 5, trimming to a desired size is accomplished by the movement vertically or horizontally with the aid of the knurled end or knob of the clamp shaft 7. When, after rotation, the clamp shaft 7 is secured, movement in vertical and horizontal directions are completed, and the film is clamped. The operation of the device is described in greater detail as follows.

For trimming in a horizontal direction, the end of the clamp shaft 7 is freely movable in a horizontal direction because of the elongation in a horizontal plane of the elliptical hole 2d and the dimension of the straight sided hole 1c in a horizontal plane. The clamp shaft 7 having the horizontal sliding plate connected thereto by the nut 10 may move in a horizontal plane by virtue of the arrangement provided by the slot 11a and the screws 12. The movement of the vertical sliding plate 11, however, is limited by the sides of the hole 1c and by the confining and guiding means 1e on the adjoining main unit 1. As a result, the vertical sliding plate cannot move in a horizontal direction. For trimming in a vertical direction, the horizontal sliding plate 9 and the vertical sliding plate 11 are, in effect, combined as a unit, and may only move in a vertical direction. When clamped, the horizontal sliding plate 9, the intermediate dovetail plate 2 and the film holding plate 3 are maintained against the main unit 1 by the female screw 8, and as a result, horizontal and vertical movements are halted.

Instead of utilizing the guiding means 1e of the main unit 1 for effecting the movement of the vertical sliding plate 11, the same result may be obtained with the structure as shown in FIG. 4. A vertical sliding plate 11' is provided with a vertically extending slot 11'b, and a guide pin 12' is extended through such slot with its inner end secured to the main unit 1. The movement of the horizontal sliding plate 9 with respect to the vertical sliding plate may be accomplished by the previously described arrangement of a horizontally extending slot in the vertical sliding plate with screws or guide pins extended through the slot and secured to the underlying horizontal sliding plate.

It will be understood that it is within the scope of the invention to reverse the arrangement of the dovetails and the dovetail grooves. Instead of the dovetail grooves in the main unit 1 and the mating dovetails on the plate 2, the main unit may be provided with the dovetails and the plate 2 may be provided with the mating grooves. Also, instead of the dovetails on the plate 2 and the dovetail grooves in the film holding plate 3 as illustrated and described, the plate 2 may be provided with dovetail grooves, whereby the film holding plate 3 would be formed with the mating dovetails.

As has been stated in detail, according to this invention, trimming in horizontal direction and vertical direction are made possible so that this is particularly effective to a framed film. Moreover, since it is possible to clamp the movement in both directions with one clamp shaft while the movements in vertical and horizontal directions are possible, and since the knob of the clamp shaft can be used, as the handle for trimming, the copying device of this invention offers a great convenience. The fact that the sliding portion is hidden results in good appearance and protection of the copying device.

What I claim is:

1. A slide copying device comprising a main unit provided with a predetermined window frame, a first dovetail groove, and clamp hole; a dovetail holding plate provided with a predetermined window frame, clamp shaft escape hole, a first dovetail that engages with the first dovetail groove on the back surface, and a second and third dovetails on the front surface; a film holding plate provided with a predetermined window frame, a second dovetail groove which engages with the second dovetail, and a third dovetail groove which engages with the third dovetail on the back surface; a female screw which is fixed to the film holding plate 3; a clamp shaft which screws with said female screw, one end of which forming a handle and the other end fitting in a horizontal direction sliding a plate, the clamp shaft having means for stopping the slip out of said sliding plate, and being capable of moving said dovetail holding plate and film holding plate freely in both horizontal and vertical directions as well as sandwiching said horizontal sliding plate in said main unit and clamping it at any position; the horizontal direction sliding plate being fitted into said clamp shaft and engaged with a horizontal direction guiding means provided on a vertical direction sliding plate; said vertical direction sliding plate being movable in a vertical direction along a vertical direction guiding means provided on said main unit.